US005523958A

United States Patent [19]

Takeuchi

[11] Patent Number: 5,523,958

[45] Date of Patent: Jun. 4, 1996

[54] APPARATUS AND METHOD OF PROCESSING IMAGE

[75] Inventor: Kesatoshi Takeuchi, Shinjuku, Japan

[73] Assignee: Seiko Epson Corporation, Tokyo, Japan

[21] Appl. No.: 74,675

[22] Filed: Jun. 10, 1993

[30] Foreign Application Priority Data

| | | | |
|---|---|---|---|
| Jun. 10, 1992 | [JP] | Japan | 4-150771 |
| Feb. 9, 1993 | [JP] | Japan | 5-021414 |

[51] Int. Cl.$^{6}$ ............ H04N 11/06; H04N 11/20

[52] U.S. Cl. ............ 364/514 A; 345/4; 345/113; 345/186; 348/571; 395/100; 395/135

[58] Field of Search ............ 364/514; 345/4, 345/112, 113, 115, 116, 150, 186; 395/100, 133, 135; 348/571, 578, 584, 586, 587, 589

[56] References Cited

U.S. PATENT DOCUMENTS

| | | | |
|---|---|---|---|
| 4,409,618 | 10/1983 | Inaba et al. | 358/183 |
| 4,667,221 | 5/1987 | Cawley et al. | 358/22 |
| 4,823,281 | 4/1989 | Evangelisti et al. | 364/518 |
| 4,827,253 | 5/1989 | Maltz | 340/734 |
| 4,839,828 | 6/1989 | Elsner et al. | 364/518 |
| 4,857,905 | 8/1989 | Ogawa | 340/748 |
| 4,982,343 | 1/1991 | Hourvitz et al. | 364/521 |
| 4,992,781 | 2/1991 | Iwasaki et al. | 340/747 |
| 5,093,798 | 3/1992 | Kita | 364/518 |
| 5,179,642 | 1/1993 | Komatsu | 395/13 J |
| 5,301,027 | 4/1994 | Kiyofuji et al. | 348/589 |
| 5,305,107 | 4/1994 | Gale et al. | 548/590 |
| 5,305,108 | 4/1994 | Trytko | 348/594 |
| 5,343,252 | 8/1994 | Dadourian | 348/586 |
| 5,357,286 | 10/1994 | Hwang | 348/589 |

FOREIGN PATENT DOCUMENTS

| | | |
|---|---|---|
| 2-298176A | 12/1990 | Japan . |
| 4-156496A | 5/1992 | Japan . |

OTHER PUBLICATIONS

Gonzalez et al., *Digital Image Processing*, Nov. 1987, pp. 190–193 and plate IV.

*Primary Examiner*—Ellis B. Ramirez
*Assistant Examiner*—Patrick J. Assouad
*Attorney, Agent, or Firm*—Oblon, Spivak, McClelland, Maier & Neustadt

[57] ABSTRACT

A reference value memory circuit 552 in a video switch control circuit 550 stores upper threshold values DU and lower threshold values DL of respective colors defining a predetermined range of chromaticity. A color comparator circuit 554 compares these upper threshold values DU and the lower threshold values DL with a second video signal LSMEM. When a color represented by the second video signal is within the predetermined range of chromaticity, a color comparison signal S1, which is an output of the color comparator circuit 554, becomes at H level, while the color comparison signal S1 becomes at L level when the color is out of the predetermined range of chromaticity. A selection signal S2 is generated according to the color comparison signal S1 and a switcher signal CNT. A video switch 510 selects one of a first video signal LSPC output from a computer and a second video signal LSDA output from a video memory 310 in response to the selection signal S2. As a result, only a desirable portion of the second video image is superimposed over the first video image.

21 Claims, 13 Drawing Sheets

APPARATUS AND METHOD OF PROCESSING IMAGE

BACKGROUND OF THE INVENTION

1. Field of the Invention

The present invention relates to an image processing apparatus applicable to a computer system and a method of the same, and more specifically to an image processing apparatus and a method of superimposing a second video image over at least part of a first video image.

2. Description of the Related Art

A known technique for superimposing a second video image on a first video image on a display is typically disclosed in description and FIG. 2 of JAPANESE PATENT LAYING-OPEN GAZETTE No. 2-298176 by the applicant of the present invention.

FIG. 18 shows a conventional method of superimposing a video image over another on a monitor of a personal computer with the known technique. A first video image, including letter images such as "A" and "B", generated by the personal computer is masked in a rectangular superimposed area SIA while a second video image, including a vehicle image, given by a video unit is displayed in the superimposed area SIA.

In the example of FIG. 18, a background image area in the second video image other than a vehicle image is sometimes not required and is to be favorably replaced by the video image generated by the personal computer. In the conventional technique, however, a superimposed area of a predetermined shape is previously set, and it is thereby impossible to superimpose only the vehicle image portion. This causes a non-required background image to exist around the required vehicle image in the superimposed area SIA, and reduces an area of the screen to display the video image generated by the personal computer accordingly. Similar problems arise in a variety of video devices such as presentation tools and game machines as well as personal computers.

SUMMARY OF THE INVENTION

An object of the present invention is to superimpose only a required image area of a second video image over a first video image.

The present invention is directed to a video processing apparatus, applicable to a computer system comprising: a processor for performing logical operation, a first video memory controlled by the processor for storing a first video signal as first video data, and display means for displaying a video image; the video processing apparatus superimposing a second video image represented by a second video signal upon at least part of a first video image represented by the first video signal, the video processing apparatus comprising: a second video memory for storing the second video signal as second video data; a memory for storing color range data defining a predetermined range of chromaticity; color comparator means for comparing the second video signal with the color range data to generate a color comparison signal indicating the result of the comparison; and selection means for selecting one of the first video signal and the second video signal in response to the color comparison signal, and outputting the selected video signal to the display means.

Since the selection means selects one of the first and second video signals in response to the color comparison signal, a video portion whose chromaticity is within the predetermined range of chromaticity is superimposed over the first video image, or another video portion whose chromaticity is out of the predetermined range of chromaticity is superimposed over the first video image.

Preferably, the color comparator means comprises means for setting the color comparison signal at a first level indicating selection of the first video signal when a chromaticity represented by the second video signal is within the predetermined range of chromaticity, and setting the color comparison signal at a second level indicating selection of the second video signal when the chromaticity represented by the second video signal is out of the predetermined range of chromaticity. This causes to superimpose over the first video image only the portion of the second video image which is out of the predetermined range of chromaticity.

Preferably, the color range data include an upper threshold value and a lower threshold value of each color signal for three primary colors of R (red), G (green), and B (blue); and the color comparator means further comprises means for judging whether all of the color signals for the three primary colors constituting the second video signal are within respective ranges between the upper threshold values and the lower threshold values. This makes it possible to set the range of chromaticity with the upper and lower threshold values of the color signals for the three primary colors.

The video processing apparatus may further comprise: control means for supplying a read enable signal to the second video memory, the read enable signal allowing to read out the second video data at such a timing that the second video image is displayed on a previously specified area in the first video image. Since the second video signal is read out on the specified area in the first video image, the second video image can be superimposed in the specified area.

The video processing apparatus may further comprise: selection signal generator means, inserted between the color comparator means and the selection means, for generating a selection signal by performing logical operation of the color comparison signal and a predetermined switcher signal, and outputting the selection signal to the selection means to allow the selection means to select one of the first video signal and the second video signal. The selection signal generator means can change superimposing modes by alternating the level of the color comparison signal.

The video processing apparatus may further comprise: multi-superimpose control means for generating an enable signal as the switcher signal, the enable signal showing whether or not to further superimpose the first video image upon at least part of the second video image which is superimposed upon the first video image. The multi-superimpose control means can perform multi-superimposing of the first and second video images.

The multi-superimpose control means comprises means for generating the enable signal when at least one of color signals for three primary colors constituting the first video signal exceeds a predetermined level. Only the portion of the first video image which is more than the predetermined level is superimposed over the second video image accordingly.

The video processing apparatus may further comprise: inversion means for generating an inversion specification signal as the switcher signal, the inversion specification signal specifying whether or not to invert the color comparison signal. The portion of the second video image to be superimposed and the other portion of the second video image to be not superimposed are exchanged through inverting the color comparator means by the inversion means.

The video processing apparatus may comprise: decoder means for decoding a fourth video signal externally given as an analog composite signal, to thereby separate the fourth video signal into a synchronizing signal and an analog color signal; conversion means for converting the analog color signal into a digital color signal; and write control means for writing the digital color signal as the second video data in the second video memory. This enables to superimpose the second video image represented by a externally-given composite signal over the first video image.

The video processing apparatus may further comprise: a television tuner for receiving a television signal as the fourth video signal. This enables to superimpose a television image over the first video image.

The present invention is also directed to a computer system comprising: a processor for performing logical operation; a first video memory controlled by the processor for storing a first video signal as first video data; display means for displaying a video image; and the above described video processing apparatus. The computer system can attain the same functions as those of the video processing apparatus.

The present invention is still further directed to a video processing method, applicable to a computer system comprising: a processor for performing logical operation, a first video memory controlled by the processor for storing a first video signal as first video data, and display means for displaying a video image; the video processing apparatus superimposing a second video image represented by a second video signal upon at least part of a first video image represented by the first video signal, the video processing method comprising the steps of: (a) storing the second video signal as second video data in a second video memory; (b) comparing the second video signal with a color range data defining a predetermined range of chromaticity, to thereby generate a color comparison signal indicating the result of the comparison; and (c) selecting one of the first video signal and the second video signal in response to the color comparison signal, and outputting the selected video signal to the display means.

These and other objects, features, aspects and advantages of the present invention will become more apparent from the following detailed description of the present invention when taken in conjunction with the accompanying drawings.

DESCRIPTION OF THE PREFERRED EMBODIMENT

A. System Structure

Figure 1:
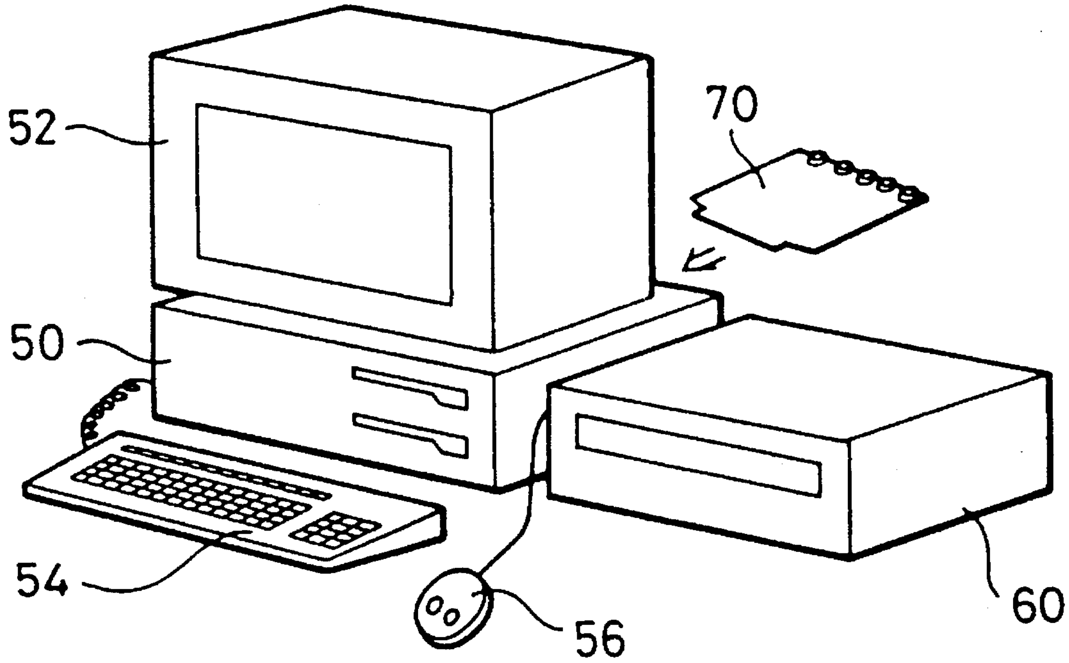
FIG. 1 is a perspective view illustrating a computer system having a video processing circuit according to the present invention.

FIG. 1 is a perspective view illustrating a computer system having a video processing circuit according to the present invention. The computer system comprises a personal computer body 50, a color monitor 52, a keyboard 54, a mouse 56, and a video player 60. An extension board 70 including the video processing circuit (described later) is inserted in an extension slot of the personal computer body 50. The extension board 70 is connected with the personal computer body 50, the color monitor 52, and the video player 60 via cables (not shown), respectively. The video player 60 outputs to the extension board 70 a second video signal representing a second video image to be superimposed.

B. Preparation of Superimposing Video Data

Figure 2:
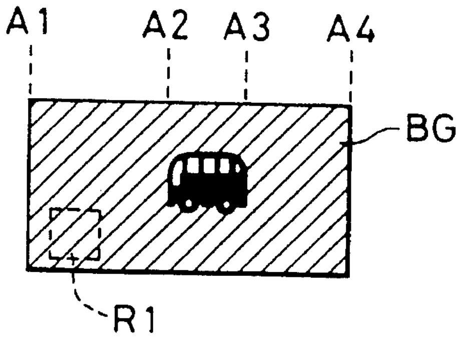
FIG. 2 is a plan view showing a video image to be superimposed.

FIG. 2 shows a process for preparing the second video image to be superimposed in this embodiment. In FIG. 2, a vehicle image is placed on a background image BG filled with a uniform color. The background image BG is not required to display, and filled with a predetermined color different from the color of the vehicle image. As described later, the image area which is filled with substantially the same color as that of the background image BG is not displayed on a screen in the superimposing process. The color of the background image BG is analyzed at the first step of preparation of the second video image for the superimposing in the following manner.

Figures 3A, 3B, 3C:
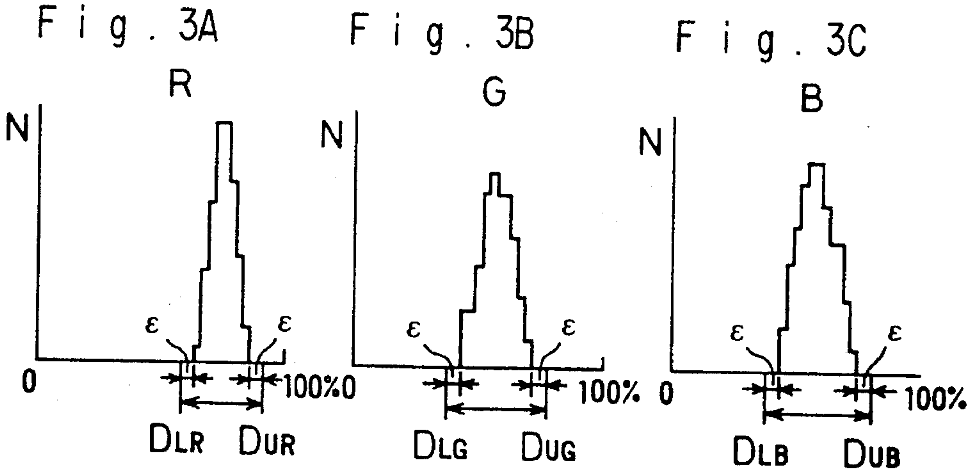
FIGS. 3A–3C are histograms showing luminance of three primary colors obtained by color separation of video data for a background image area.

An image area including only the part of the background image BG, for example, an image area R1, is taken with a video camera, and image data representing the image area is analyzed by the personal computer. FIGS. 3A–3C are histograms showing luminance of three primary colors R (red), G (green), and B (blue), respectively, obtained by color separation of image data of the background image BG. The abscissa indicates luminance percent, and the ordinate indicates the number of pixels N. The terminology of 'luminance' in this specification denotes a stimulus value of the three primary colors. As shown in FIGS. 3A–3C, upper threshold values DUR, DUG, and DUB and lower threshold values DLR, DLG, and DLB are determined by respectively adding a predetermined margin ε to maximum and minimum luminances of the primary colors R, G, and B. In the actual superimposing process described later, an image area whose color signals of the primary colors R, G, and B have levels within the respective ranges between the upper threshold values DUR, DUG, and DUB and the lower threshold values DLR, DLG, and DLB is judged to have substantially the same color as that of the background image BG. The process of analyzing the image data of the background image BG to obtain the upper threshold values DUR, DUG, and DUB and the lower threshold values DLR, DLG, and DLB is implemented by a prescribed software program.

Figure 4:
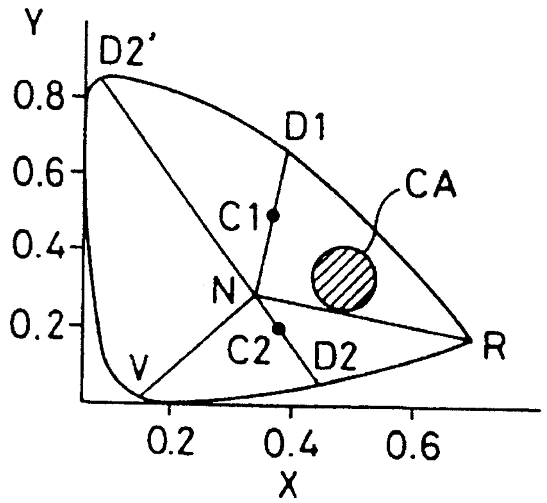
FIG. 4 is a chromaticity diagram showing a specified color area CA defined by upper threshold values and lower threshold values of the three primary colors R, G, and B.

FIG. 4 is a CIE chromaticity diagram showing a specified color area CA defined by the upper threshold values DUR, DUG, and DUB and the lower threshold values DLR, DLG, and DLB of the three primary colors R, G, and B. The CIE chromaticity diagram is recommended by the International Lighting Committee and defined by JIS Z8701 in Japan. The specified color area CA in FIG. 4 has a chromaticity of pinkish color. The background image BG can be filled with any desirable color which is not included in a desirable image area to be superimposed (the vehicle image in the example of FIG. 2).

A moving picture is then taken, where the vehicle is moving in front of the background image BG. Although the example of FIG. 2 shows an image of a two-dimensional object, a three-dimensional object, such as a human-being, an animal, and a robot, can be moved before the background image BG consisting of a screen or a wall of a predetermined color. Once video data is thus obtained, the video player 60 reproduces a video image according to the video data, which is superimposed over another image generated by the personal computer body 50 and displayed on the color monitor 52.

C. Internal Structure of Video Processing Apparatus

Figure 5:
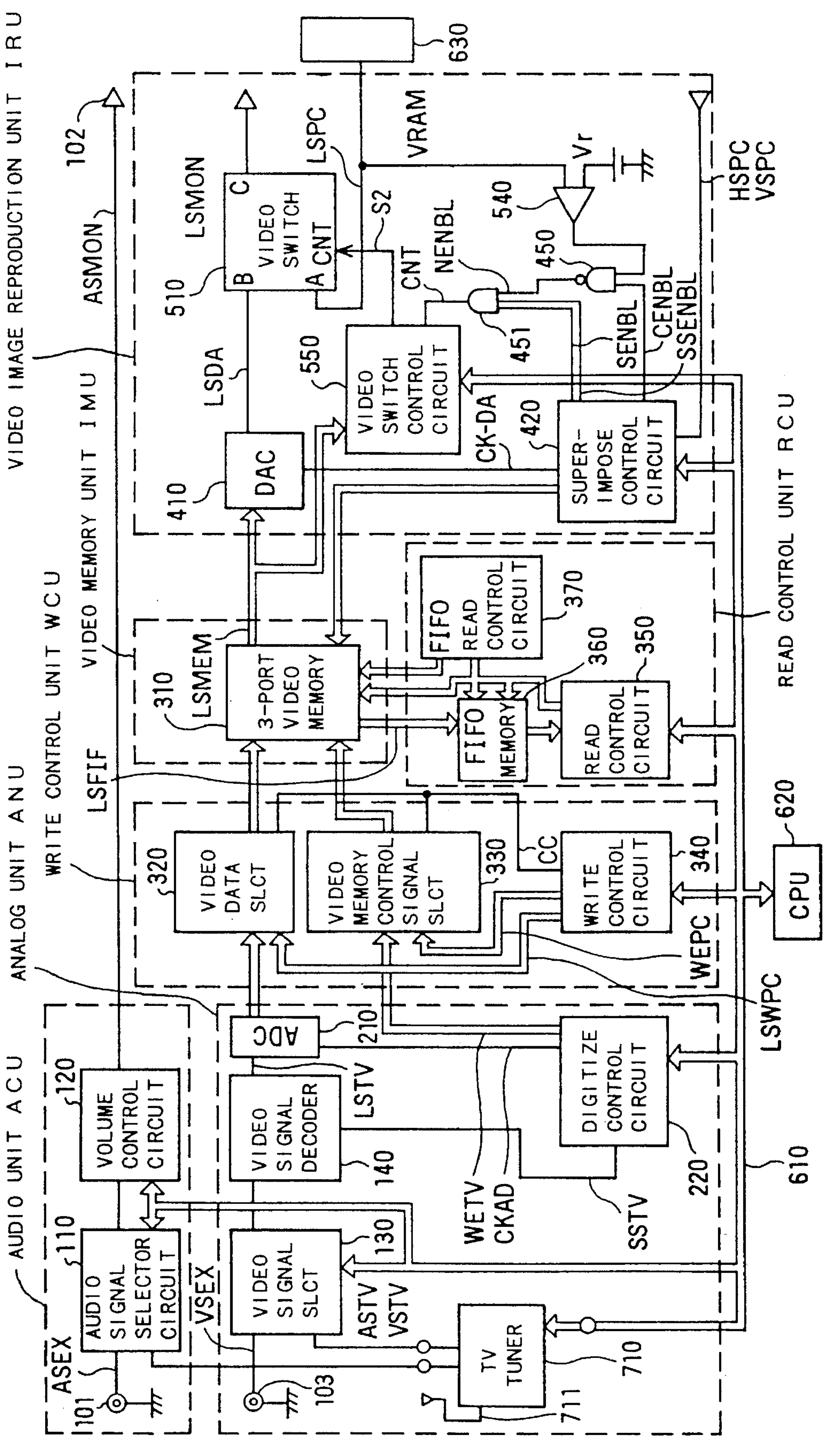
FIG. 5 is a block diagram showing a video processing circuit included in an extension board 70.

FIG. 5 is a block diagram showing the video processing circuit included in the extension board 70. FIG. 5 also shows a CPU 620, a CPU bus 610, and a video RAM 630 in the personal computer body 50.

The video processing circuit comprises an audio unit ACU for processing audio signals, an analog unit ANU for processing analog video signals including television signals, a video memory unit IMU, a write control unit WCU for controlling writing of video data in the video memory unit IMU, a read control unit RCU for reading out the video data stored in the video memory unit IMU to an external device, and a video image reproduction unit IRU for reproducing a video image.

The audio unit ACU includes an audio input terminal 101, an audio signal selector circuit 110, a volume control circuit 120, and an audio output terminal 102. The audio input terminal 101 receives an audio signal ASEX supplied from the video player 60. The audio signal selector circuit 110 selects one of the audio signal ASEX and another audio signal ASTV input from a TV tuner 710 of the analog unit ANU and outputs the selected audio signal. The CPU 620 determines the channel tuning in the TV tuner 710. The selected audio signal is processed by the volume control circuit 120 and output from the audio output terminal 102. A resultant audio signal ASMON output from the audio output terminal 102 is sent to an audio input terminal of the color monitor 52 or to a speaker.

The analog unit ANU includes the TV tuner 710, a TV antenna 711, a video input terminal 103, a video signal selector circuit 130, a video signal decoder 140, an A-D converter 210, and a digitize control circuit 220. The video input terminal 103 receives a composite video signal VSEX sent from the video player 60. The video signal selector circuit 130 selects one of the composite video signal VSEX and another composite video signal VSTV input from the TV tuner 710 according to the channel tuning instruction of the CPU 620 and outputs the selected composite video signal. The selected composite video signal is separated into a video signal LSTV and a synchronizing signal SSTV. The video signal LSTV consists of color signals of the three primary colors R, G, and B. The A-D converter 210 converts the analog video signal LSTV into a digital video signal and sends the digital video signal to the write control unit WCU. The digitize control circuit 220 regulates the A-D converter based on the synchronizing signal SSTV and controls a video memory 310 via the write control unit WCU.

The write control unit WCU includes a video data selector circuit 320, a video memory control signal selector circuit 330, and a write control circuit 340. In response to a write selection signal CC output from the write control circuit 340, the video data selector circuit 320 selectively outputs one of the digital video signal which is converted from the analog video signal LSTV and output from the A-D converter 210, and a video signal LSWPC which is read out by the CPU 620 from an external unit such as an external memory unit. The video memory control signal selector circuit 330 selectively outputs a video memory control signal WETV output from the digitize control circuit 220 or another video memory control signal WEPC output from the write control circuit 340 according to the write selection signal CC. The write control circuit 340 controls writing of the video signal LSWPC read out of the external unit by the CPU 620 into the video memory unit IMU.

The read control unit RCU includes a read control circuit 350, a First-In First-Out memory (FIFO memory) 360, and an FIFO read control circuit 370. A video signal LSFIF read out of the video memory unit IMU by the FIFO read control circuit 370 is stored in the FIFO memory 360. The read control circuit 350 reads the video signal LSFIF stored in the FIFO memory 360 to an external unit. The read control unit RCU is used to output video data stored in the video memory unit IMU to an external device according to an instruction of the CPU 620.

The video memory unit IMU includes a three-port video memory 310 having one write port and two read ports. For example, CXK1206 manufactured by Sony Co. Ltd. or MB81C1501 by Fujitsu Ltd. can be used as the three-port video memory 310. The structure and functions of the three-port video memory 310 are described in detail in a commonly-owned co-pending U.S. patent application Ser. No. 08/185,155, now allowed, which is a continuation of Ser. No. 08/039,708 filed on Mar. 31, 1993, which is a continuation application of Ser. No. 07/873,322, which is a continuation application of Ser. No. 07/474,768, the disclosure of which are incorporated by reference herein. The video memory 310 is not limited to the three-port type, but any video memory for storing video data can be applied.

Figure 6:
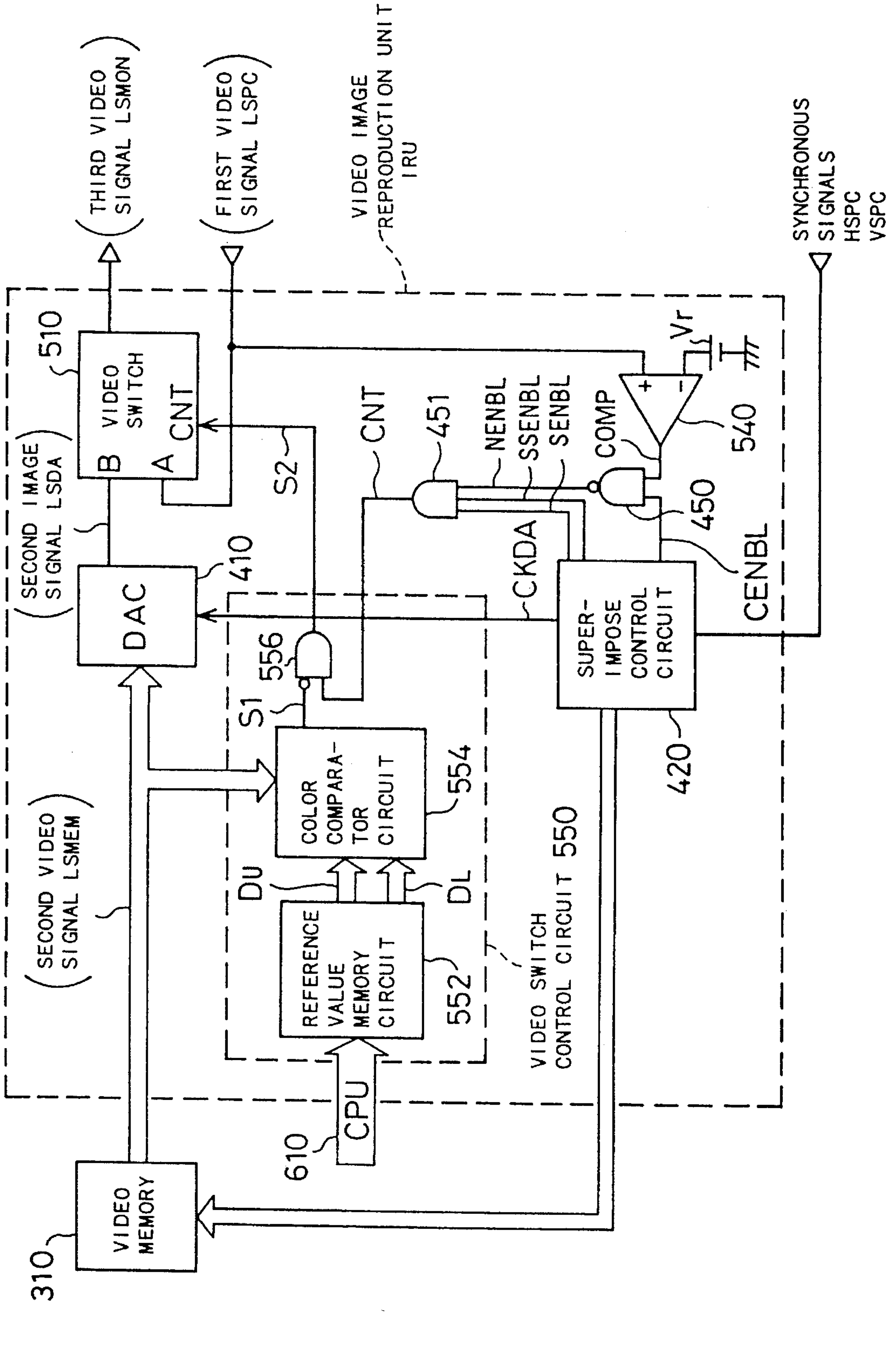
FIG. 6 is a block diagram showing a video image reproduction unit IRU and a video memory 310 more in detail.

FIG. 6 is a block diagram showing the video image reproduction unit IRU and the video memory 310 more in detail. The video image reproduction unit IRU includes a D-A converter 410, a video switch 510, a video switch control circuit 550, a superimpose control circuit 420, an NAND circuit 450, an AND circuit 451, and a voltage comparator circuit 540. HA118104 manufactured by Hitachi, Ltd. can be used as the video switch 510.

Figure 7B:
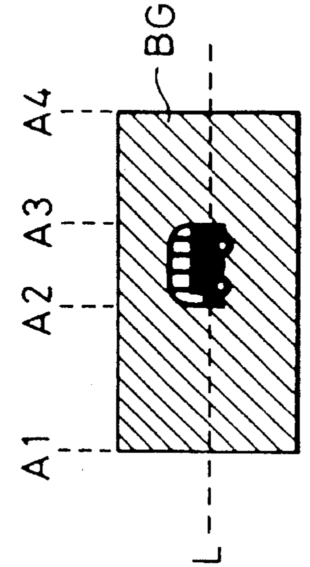
FIGS. 7(A) through 7(C) show superimposing functions of the video image reproduction unit IRU.
Figure 7A:
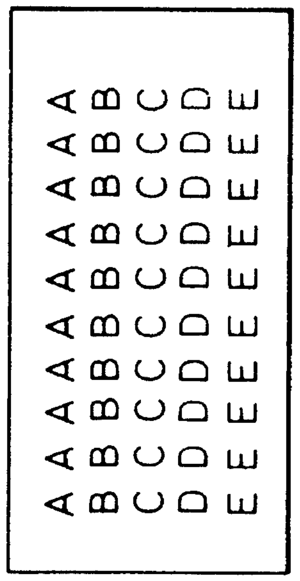
Figure 7C:
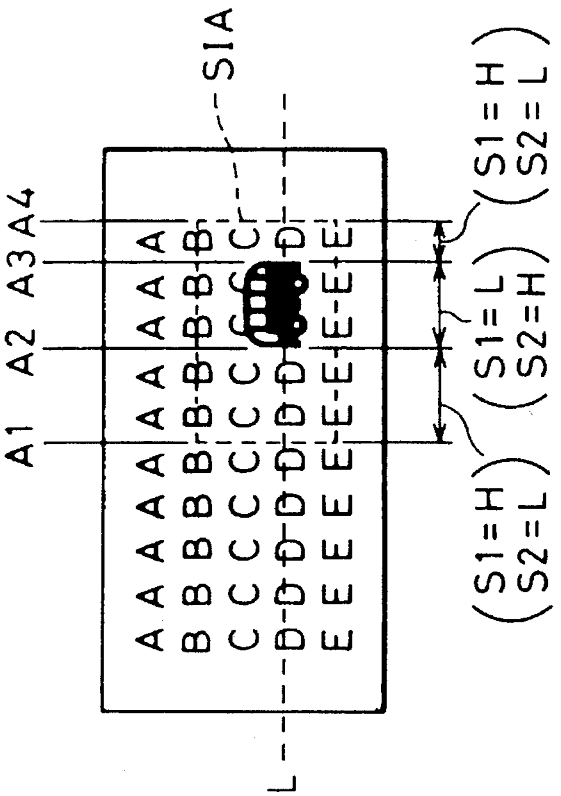

FIGS. 7(A)–7(C) shows a superimposing process by the video image reproduction unit IRU. The video image reproduction unit IRU combines a first video signal LSPC output from the video RAM 630 of the personal computer body 50 and a second video signal LSMEM output from the video memory 310 to generate and output a third video signal LSMON to the color monitor 52.

Signals shown in FIG. 6 represent the following information, respectively:

LSPC: First video signal output from the video RAM 630 of the personal computer body 50;

LSMEM: Second video signal read out of the video memory 310;

LSDA: Analogized second video signal;

LSMON: Third video signal representing a video image displayed on the color monitor 52;

S1: Color comparison signal which becomes at H level when a color represented by the second video signal LSMEM is within the specified color area CA (FIG. 4), and at L level when the color is out of the specified color area CA;

S2: Selection signal to be supplied to the video switch 510. The second video signal LSDA is selected when the selection signal S2 is at H level, while the first video signal LSPC is selected when the selection signal S2 is at L level;

CNT: Switcher signal switching between superimposing and non-superimposing. When the switcher signal CNT is at H level, the second video signal LSDA is superimposed over the first video signal LSPC according to the color comparison signal S1;

SENBL: First enable signal for specifying whether or not to enable superimposing. The first enable signal SENBL becomes at H level when the operator specifies a superimpose mode with the keyboard 54 or the mouse 56, and at L level when a non-superimpose mode is specified.

SSENBL: Second enable signal indicating a timing corresponding to a superimpose area SIA (FIG. 7(C)) on the screen. The second enable signal SSENBL becomes at H level in the superimpose area SIA and at L level out of the superimpose area SIA. The superimpose area SIA is specified by the operator on the screen of the color monitor 52;

NENBL: Enable signal indicating whether or not to enable multi-superimposing. This enable signal indicates whether the first video signal LSPC is to be superimposed over part of the second video signal LSDA, which is superimposed over the first video signal LSPC;

COMP: Comparison signal indicating a multi-superimpose area. The level of the comparison signal COMP is determined by comparing the first video signal LSPC with a predetermined reference voltage Vr, and it becomes at H level within the area in which the first video signal LSPC is superimposed upon part of the second video signal LSDA. The comparison signal COMP is made effective and output as the third enable signal NENBL when an enable signal CENBL below is at H level; and CENBL: Third enable signal for specifying whether or not to enable multi-superimposing. The level of the enable signal CENBL is changed by the operator.

The D-A converter 410 shown in FIG. 6 converts the second video signal LSMEM read out of the video memory 310 to an analog signal and supplies it to the video switch 510. The video switch 510 selects one of the first video signal LSPC output from the video RAM 630 of the personal computer body 50 and the second video signal LSDA output from the D-A converter 410 according to the selection signal S2, and sends the selected video signal as the third video signal LSMON to the color monitor 52. The selection signal S2 to the video switch 510 is supplied from the video switch control circuit 550.

The video switch control circuit 550 generates the selection signal S2 according to the switcher signal CNT output from the AND circuit 451. The video switch control circuit 550 includes a reference value memory circuit 552, a color comparator circuit 554, and an AND circuit 556 as shown in FIG. 6. The reference value memory circuit 552 stores the upper threshold values DUR, DUG, and DUB and the lower threshold values DLR, DLG, and DLB of the three primary colors R, G, and B of the background image BG (FIGS. 3A–3C). These upper and lower threshold values are read out of the reference value memory circuit 552 and given to the color comparator circuit 554.

Figure 8:
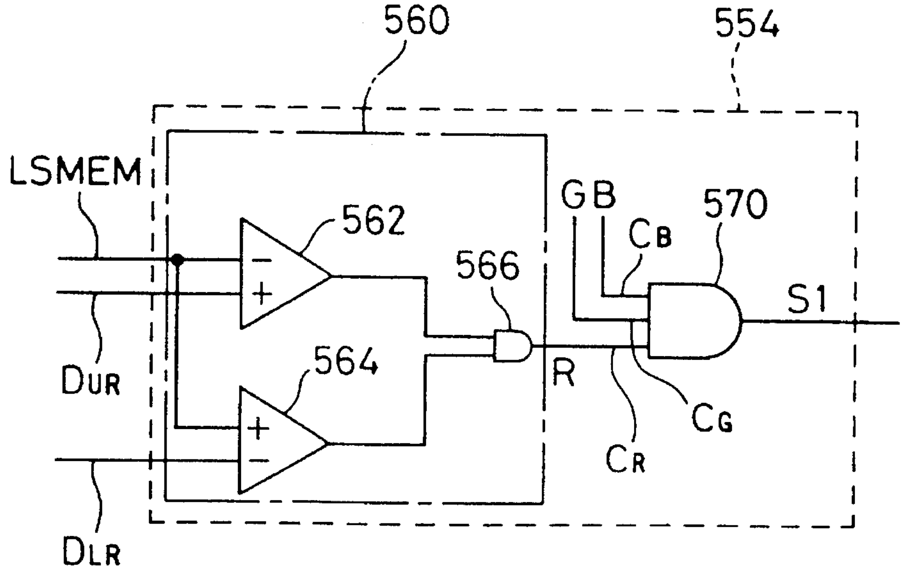
FIG. 8 is a block diagram showing the internal structure of a color comparator circuit 554.

FIG. 8 is a block diagram showing an internal structure of the color comparator circuit 554. The color comparator circuit 554 includes three window comparators 560 for the respective color signals R, G, and B and an AND circuit 570. The window comparators for G and B components are omitted in FIG. 8 for convenience of illustration. Operation of the color comparator circuit 554 is described below for the R component of the video signal.

The window comparator 560 includes first and second comparators 562 and 564 and an AND circuit 566. The first comparator 562 compares the upper threshold value DUR supplied from the reference value memory circuit 552 with the R component of the second video signal LSMEM supplied from the video memory 310. Meanwhile the second comparator 564 compares the lower threshold value DLR supplied from the reference value memory circuit 552 with the R component of the second video signal LSMEM. The outputs of the two comparators 562 and 564 are input to the AND circuit 566. AS a result, a comparison signal CR is output from the AND circuit 566. The comparison signal CR becomes at H level when the R component of the second video signal LSMEM is between the upper threshold value DUR and the lower threshold value DLR, and at L level when the R component is out of the range between the upper threshold value DUR and the lower threshold value DLR. The window comparators 560 for the G and B components acts in the same manner to generate comparison signals CG and CB. The comparison signals CR, CG, and CB are input to the three-input AND circuit 570.

The color comparison signal S1, which is an output of the three-input AND circuit 570, becomes at H level when all the color components R, G, and B of the video signal are within the respective ranges between the upper threshold values and the lower threshold values. On the contrary, at least one of the color components is out of the range between the upper threshold value and the lower threshold value, the color comparison signal S1 becomes at L level. In other words, the color comparison signal S1 becomes at H level when the color represented by the second video signal LSMEM is within the specified color area CA shown in FIG. 4, and at L level when the color is out of the specified color area CA. Since the specified color area CA represents a chromaticity of the background BG of the video image shown in FIG. 7(B), the color comparison signal S1 becomes at H level in a region where the color represented by the second video signal LSMEM has a chromaticity identical with that of the background BG (see FIG. 7(C)).

As seen in FIG. 6, the color comparison signal S1 is inverted and given to an input terminal of the AND circuit 556. The switcher signal CNT supplied from the AND circuit 451 is given to another input terminal of the AND circuit 556. When the switcher signal CNT is at H level, the color comparison signal S1, which is inverted at the AND circuit 556, is output as the selection signal S2 to the video switch 510. When the color represented by the second video signal LSMEM has a chromaticity equal to that of the background BG, the selection signal S2 becomes at L level, and the first video signal LSPC is selected by the video switch 510 accordingly. On the other hand, when the color represented by the second video signal LSMEM has a chromaticity different from that of the background BG, the selection signal S2 becomes at H level, and the second video signal LSDA is selected by the video switch 510. As a result, a desired portion (vehicle image portion) of the video image stored in the video memory 310 is superimposed over the video image generated by the personal computer body 50 as shown in FIG. 7(C).

When the switcher signal CNT is at L level, the selection signal S2 always becomes at L level, and the video switch 520 constantly selects the first video signal LSPC accordingly.

The superimpose control circuit 420 outputs a variety of control signals to the three-port video memory 310 responsive to a horizontal synchronizing signal HSPC and a vertical synchronizing signal VSPC, which are output from the computer body 50, to regulate a timing of reading data out of the video memory 310, and further gives a clock signal CKDA to the D-A converter 410. The superimpose control circuit 420 also outputs the first enable signal SENBL and the second enable signal SSENBL to the three-input AND circuit 451, and gives the third enable signal CENBL to the NAND circuit 450. The internal structure of the superimpose control circuit 420 will be described later.

The voltage comparator circuit 540 compares the reference voltage Vr with the first video signal LSPC, and outputs the comparison signal COMP representing the result of the comparison to the NAND circuit 450. The NAND circuit 450 receives the third enable signal CENBL and the comparison signal COMP to output the enable signal NENBL to the AND circuit 451.

Figure 9:
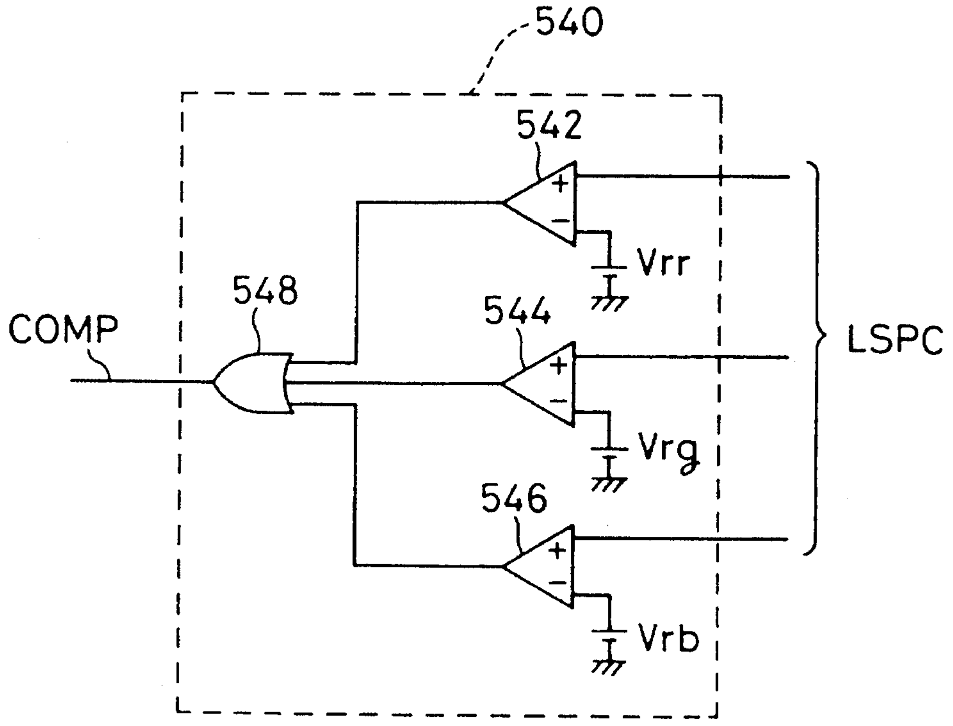
FIG. 9 is a block diagram showing the internal structure of the voltage comparator circuit 540.

FIG. 9 is a block diagram showing the internal structure of the voltage comparator circuit 540. The voltage comparator circuit 540 includes three voltage comparators 542, 544, and 546 for three color components R, G, and B, and a three-input OR circuit 548. The three voltage comparators 542, 544, and 546 are supplied with respective reference voltages Vrr, Vrg, and Vrb of the R, G, and B components. The R, G, and B components of the first video signal LSPC are respectively compared with the reference voltages Vrr, Vrg, and Vrb at the voltage comparators 542, 544, and 546, respectively, and the results of comparison are supplied to the three-input OR circuit 548. The reference voltages Vrr, Vrg, and Vrb are set at predetermined values greater than a noise level of the second video signal LSPC. When all the three color components of the first video signal LSPC are smaller than the respective reference voltages Vrr, Vrg, and Vrb, the comparison signal COMP becomes at L level, and the enable signal NENBL becomes at H level irrespective of the level of the third enable signal CENBL. Multi-superimpose functions by the voltage comparator circuit 540 and the NAND circuit 450 will be further described later.

D. Superimposing Process

Figure 10:
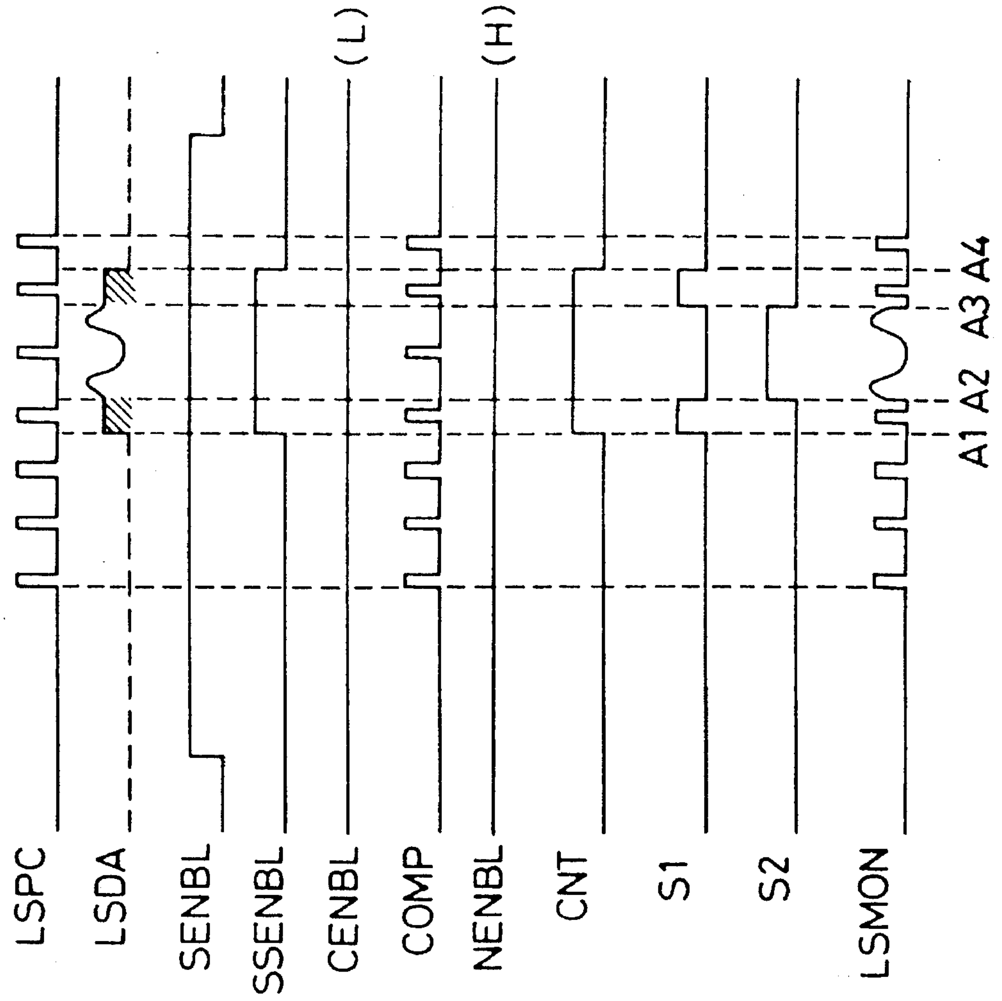
FIGS. 10(*a*) through 10(*k*) are timing charts showing operation of the video processing circuit in superimpose process.

FIG. 10 is a timing chart showing a superimposing process. Signal profiles in FIG. 10 represent those along a horizontal scanning line L of FIG. 7(C). The waveforms of the first and second video signals LSPC and LSDA are simplified. In FIG. 10, the first enable signal SENBL is set at H level, which allows the superimposing. The enable signal CENBL is set at L level, which inhibits the multi-superimposing. Since the enable signal CENBL is set at L level, the third enable signal NENBL is fixed at H level.

The second enable signal SSENBL becomes at H level within the superimpose area SIA (FIG. 7(C)) on the screen of the color monitor 52. As described before, the superimpose area SIA is previously specified by the operator, and the superimpose control circuit 420 generates the second enable signal SSENBL according to that specification. Since both the first and third enable signals SENBL and NENBL are at H level, the level of the switcher signal CNT is alternated responsive to the second enable signal SSENBL. The superimpose control circuit 420 outputs a signal which enables the output of the video memory 310 in a time period when the second enable signal SSENBL is at H level, whereby the second video signal LSDA is supplied to the video switch 510.

On the scanning line L of FIG. 7(C), a section between positions A1 and A2 and another section between positions A3 and A4 correspond to portions of the background BG of the second video image to be superimposed (FIG. 7(B)). In these sections, the color comparison signal S1, which is an output of the color comparator circuit 554 (FIG. 6), becomes at H level. On the other hand, the color comparison signal S1 becomes at L level in a section between the positions A2 and A3. Since the switcher signal CNT is kept at H level in a block between the positions A1 and A4, the selection signal S2, which is an output of the AND circuit 556, becomes an inverted signal of the color comparison signal S1. The selection signal S2 therefore becomes at H level in the section between the positions A2 and A3. As a result, the second video signal LSDA is superimposed upon the first video signal LSPC in the section between A2 and A3. FIG. 7(C) shows a video image displayed according to the third video signal LSMON thus generated (FIG. 10(*k*)).

As described above, the video processing circuit shown in FIG. 5 can superimpose only the vehicle image part of the second video image while omitting the background BG, thereby efficiently preventing to reduce an area on the monitor screen to display the video image generated by the personal computer. If the second video image is prepared by taking a picture of a moving vehicle, the vehicle will move on the screen of the color monitor 52.

Figure 11:
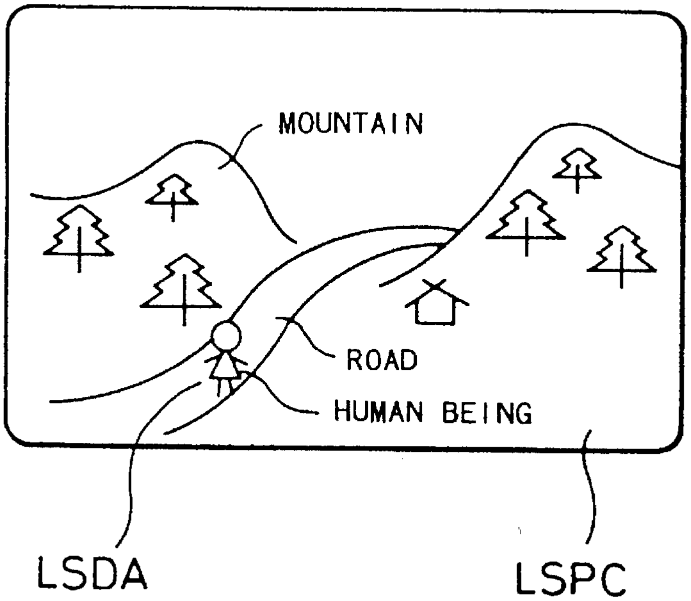
FIG. 11 is a plan view showing another example of a superimposed video image.

If a second video signal LSDA representing a human being is superimposed over a first video signal LSPC representing landscape as shown in FIG. 11, the video image in which the human being is moving in the landscape will be obtained. In this case, the second video signal LSDA is prepared by filming the human being moving before a screen of a predetermined color.

Figures 12A, 12B, 12C, 12D, 12E, 12F, 12G, 12H, 12I, 12J, 12K:
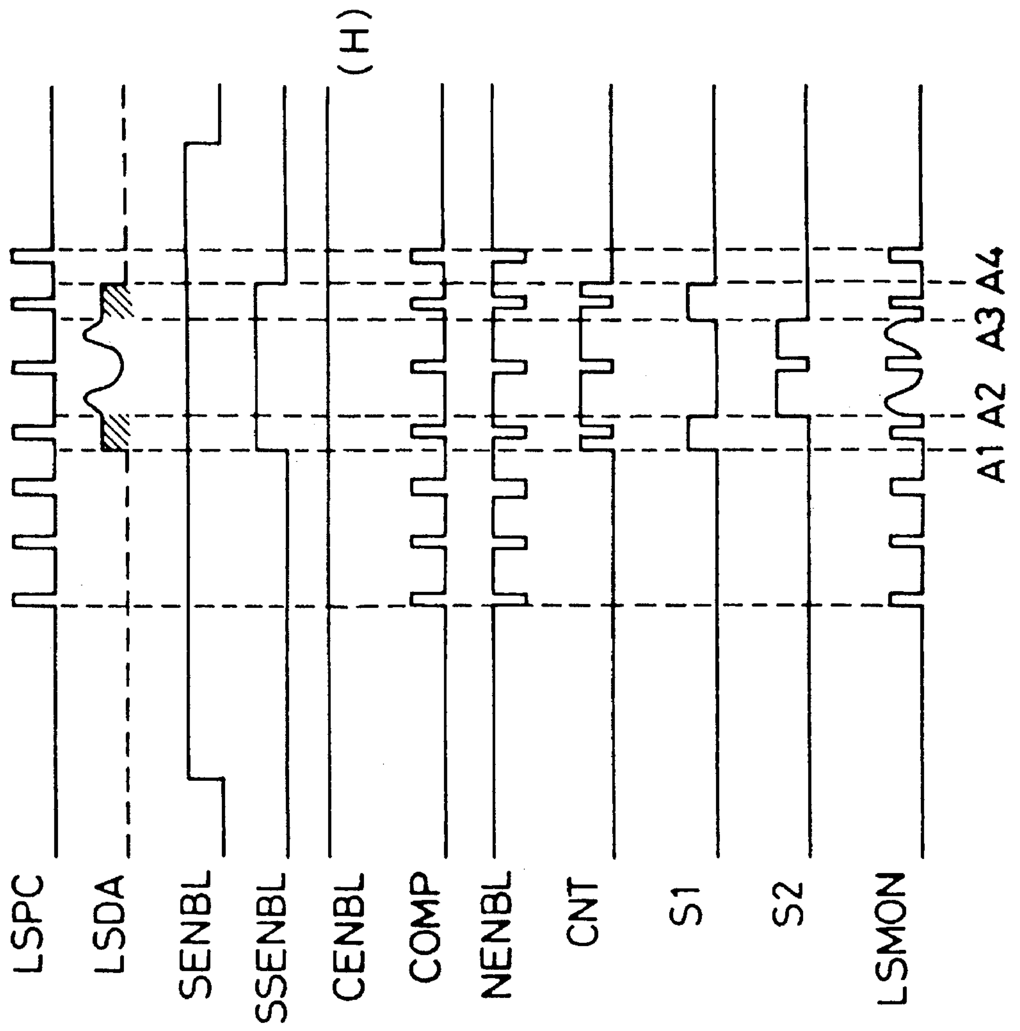
FIGS. 12(*a*) through 12(*k*) are timing charts showing operation of the video processing circuit in multi-superimpose process.

FIGS. 12(*a*)–12(*k*) are a timing chart showing the operation of the video processing circuit in the multi-superimpose process. The third enable signal CENBL of FIG. 12(*e*) is specified at H level by the operator. In this case, the enable signal NENBL, which is an output of the NAND circuit 450 (FIG. 6), becomes an inversed signal of the comparison signal COMP. The comparison signal COMP becomes at H level when the first video signal LSPC is greater than a predetermined noise level. Since the first and second enable signals SENBL and SSENBL are kept at H level in the block between the positions A1 and A4, the switcher signal CNT shows the same waveform as the enable signal NENBL in this block. Since the selection signal S2 is obtained by AND operation of the switcher signal CNT and an inversed signal of the color comparison signal S1, the selection signal S2 becomes at L level in a time period in which the switcher signal CNT is at L level even in the section between the positions A2 and A3. The resultant third video signal LSMON is such a signal in which the second video signal LSDA is superimposed over part of the first video signal LSPC and then the first video signal LSPC is further superimposed over part of the second video signal LSDA.

Figure 13:
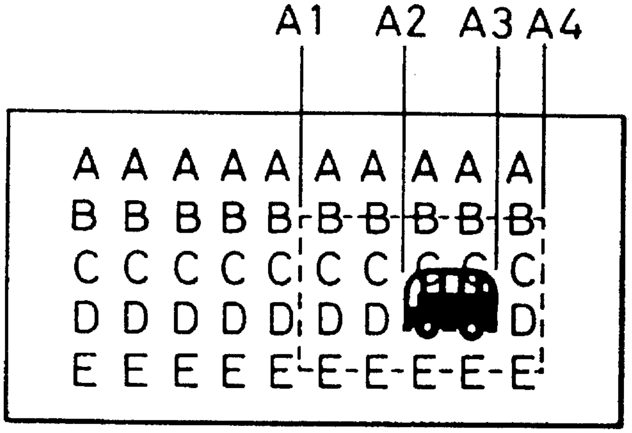
FIG. 13 is a plan view showing a video image displayed according to a third video signal LSMON of FIG. 12.

FIG. 13 is a plan view showing a video image displayed according to the third LSMON of FIG. 12(*k*). Although not clearly shown in FIG. 13, the letters generated by the personal computer body 50 appear within the vehicle image.

Figure 14:
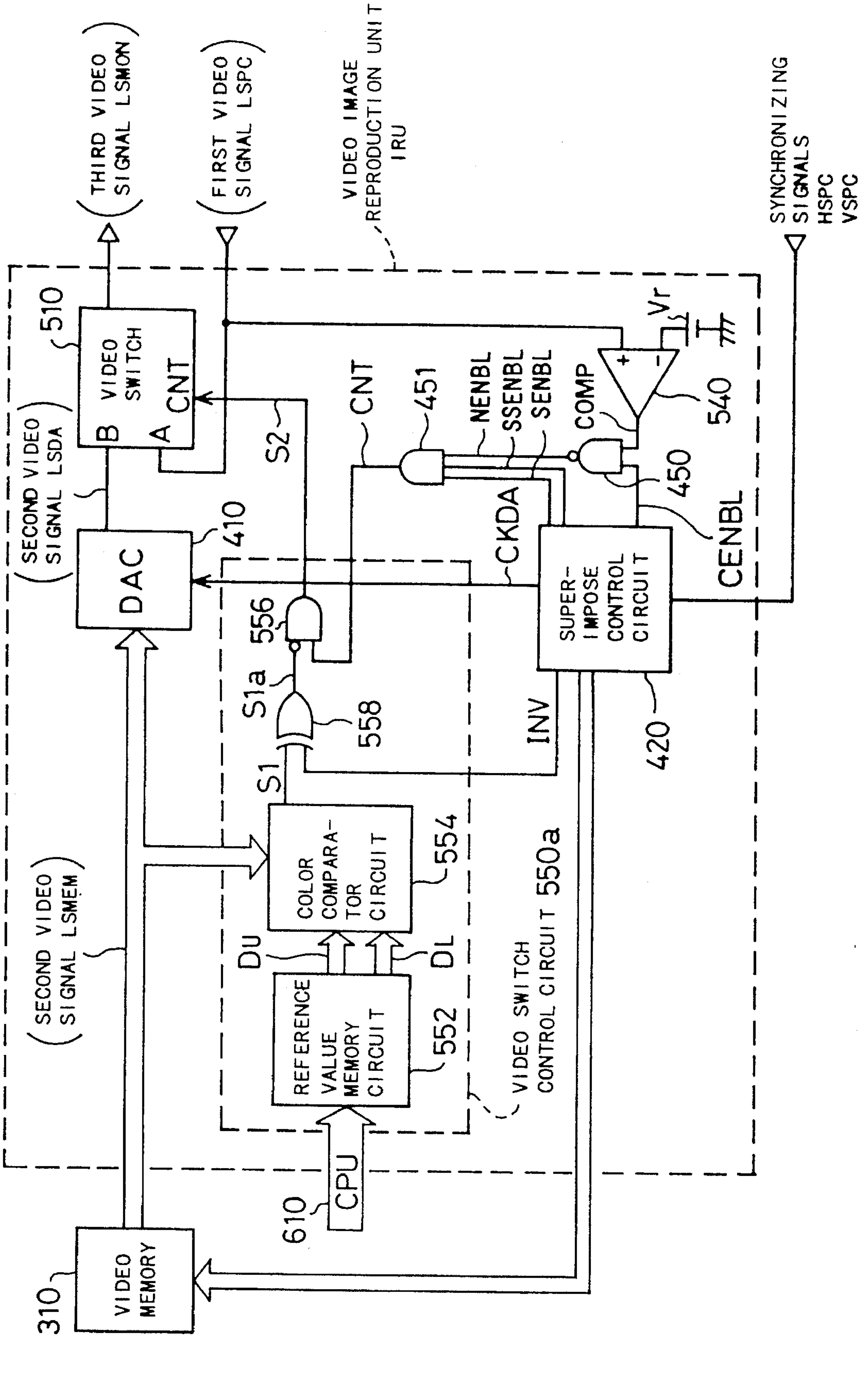
FIG. 14 is a block diagram showing a circuit structure including an EXOR circuit in the video switch control circuit.

FIG. 14 is a block diagram of a circuit which includes an EXOR circuit 558 inserted between the color comparator circuit 554 and the AND circuit 556 of the video switch control circuit 550. The circuit elements of FIG. 14 other than the EXOR circuit 558 are the same as those of FIG. 6. While an input terminal of the EXOR circuit 558 receives the color comparison signal S1 output from the color comparator circuit 554, another input terminal thereof receives an inversion signal INV. The inversion signal INV instructs whether or not to invert the color comparison signal S1 output from the color comparator circuit 554, and the level thereof is specified by the operator.

Figure 15:
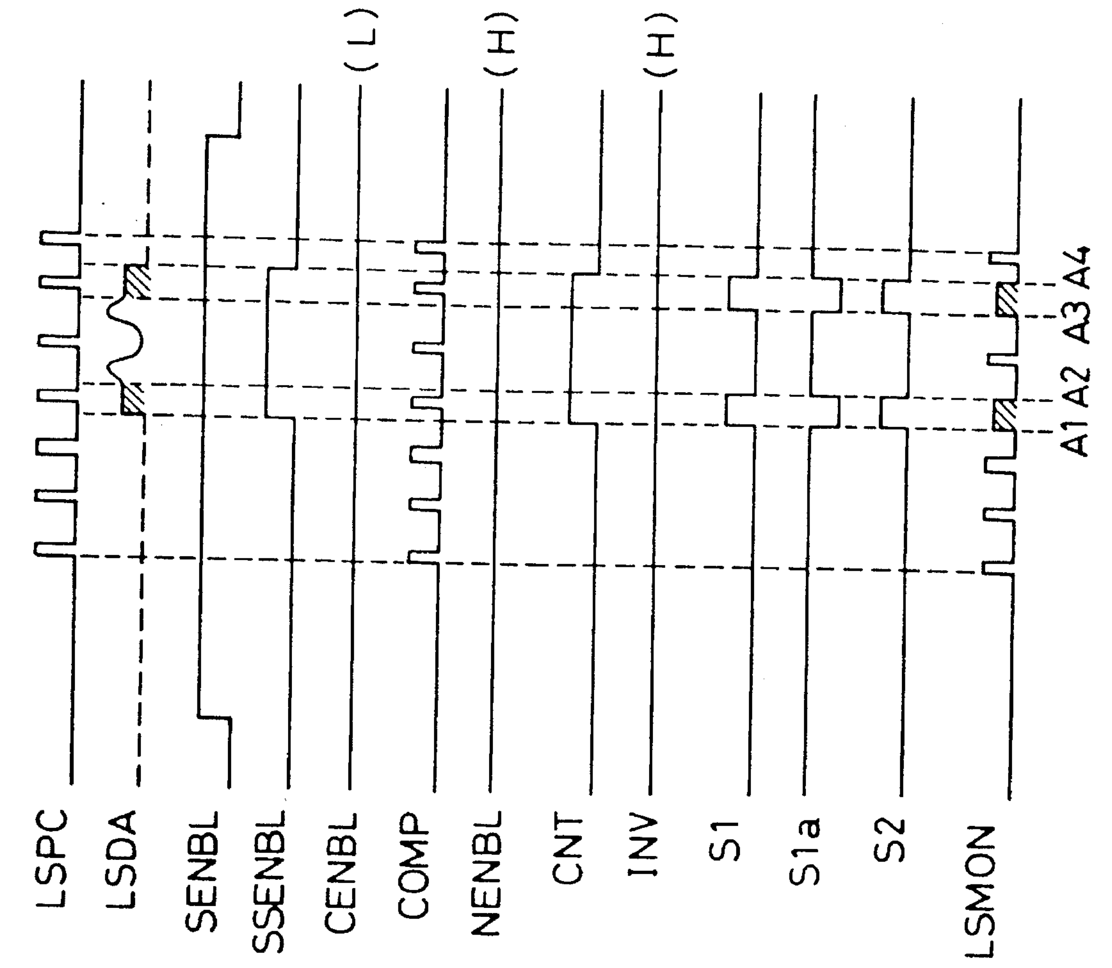
FIGS. 15(*a*) through 15(*m*) are timing charts showing operation of the video processing circuit when an inversion signal INV is set at H level.
Figure 16:
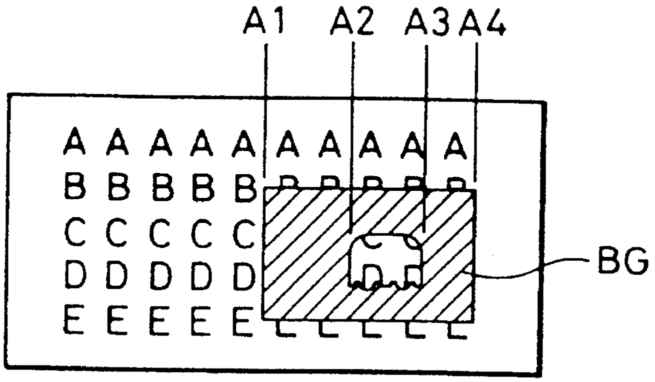
FIG. 16 is a plan view showing a video image displayed according to the third video signal LSMON of FIG. 15.
Figure 18:
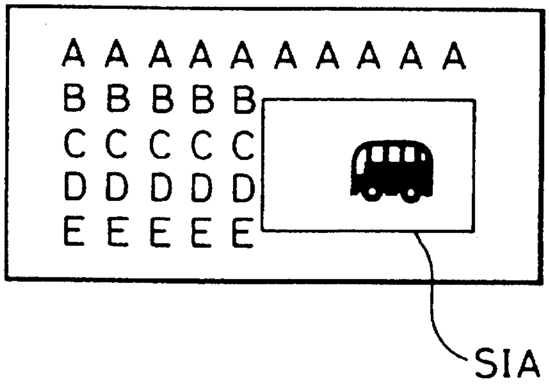
FIG. 18 is a plan view showing an superimposed video image according to a conventional method.

FIGS. 15(*a*)–15(*m*) are a timing chart showing the operation of the video processing circuit when the inversion signal INV is set at H level. The signals of FIGS. 15(*a*) through 15(*h*) are the same as those of FIG. 10. When the inversion signal INV is set at H level, an output signal S1a of the EXOR circuit 558 is an inverted signal of the color comparison signal S1. The selection signal S2 therefore becomes at H level in the sections between A1 and A2 and between A3 and A4 as shown in FIG. 15(*l*), and the second video signal LSDA is selected as the third video signal LSMON in these sections accordingly. The selection signal S2 becomes at L level in the section between A2 and A3, and the first video signal LSPC is selected as the third video signal LSMON. FIG. 16 is a plan views showing a video image displayed according to the third video signal LSMON of FIG. 15(*m*). When the inversion signal INV is set at H level, a video image in which only the background BG of the second video image is superimposed is displayed on the color monitor 52. When the inversion signal INV is set at L level, on the other hand, the video image shown in FIG. 7(C) is displayed on the color monitor 52.

As described above, a video image portion-to-be-superimposed, or the vehicle image, can be exchanged with a video image portion-to-be-not-superimposed, or the background, with the video processing circuit including the EXOR circuit 558. When the enable signal CENBL for specifying whether or not to enable multi-superimposing is set at H level in the circuit of FIG. 14, the video image represented by the first video signal LSPC can be superimposed over the superimposed area, or the background BG of FIG. 16, in the same manner as FIGS. 12 and 13.

E. Internal Structure of the Superimpose Control Circuit

Figure 17:
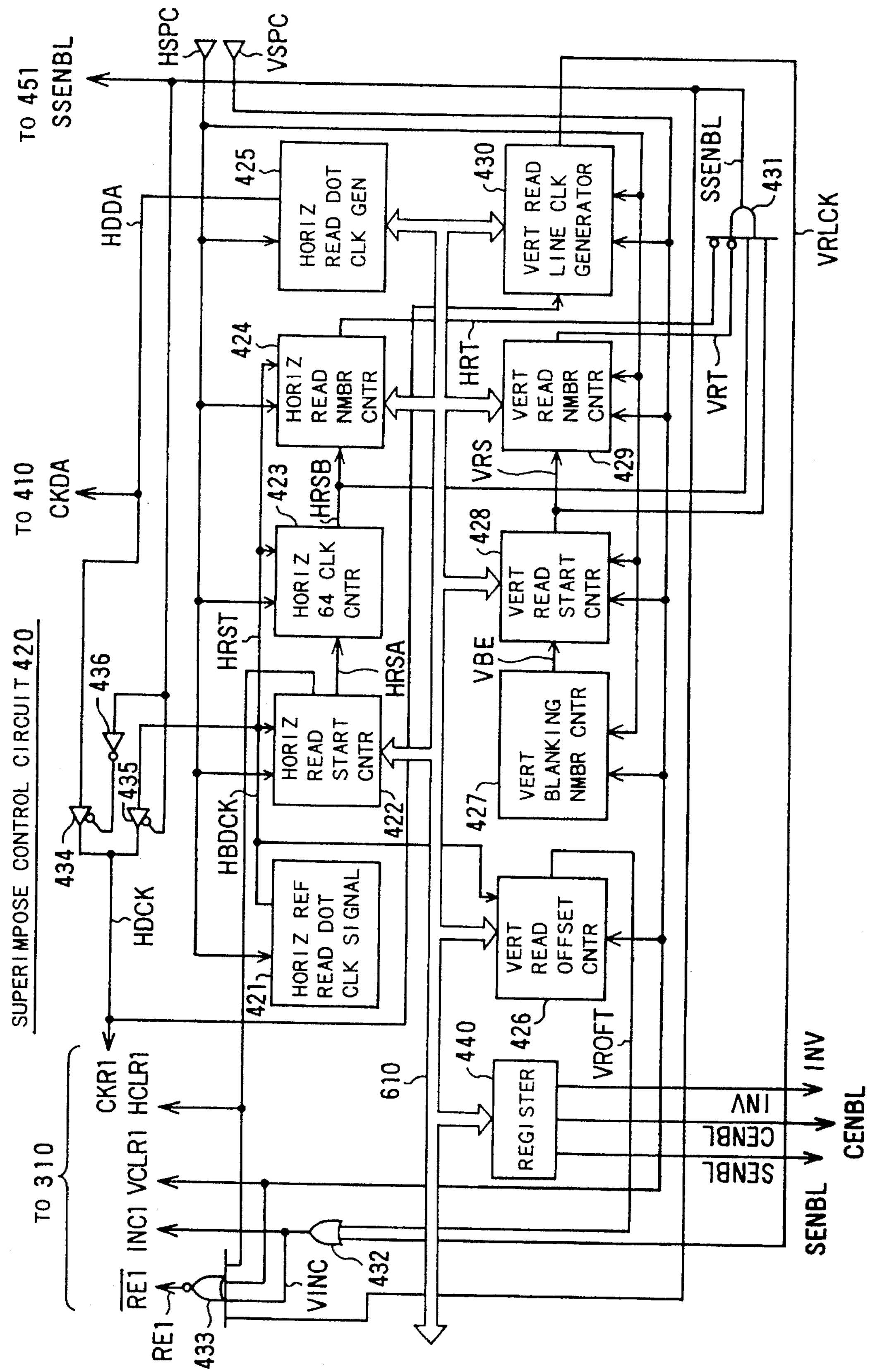
FIG. 17 is a block diagram showing the internal structure of the superimpose control circuit 420.

FIG. 17 is a block diagram showing the internal structure of the superimpose control circuit 420. The superimpose control circuit 420 is formed by adding a register 440 to the circuit shown in FIG. 14 of JAPANESE PATENT LAID-OPEN GAZETTE No. 2-298176 disclosed by the applicant of the present invention. The enable signal SENBL in FIG. 14 of the GAZETTE No. 2-298176 is the same as the second enable signal SSENBL shown in FIG. 17 of the present invention. The levels of the enable signals SENBL and CENBL and of the inversion signal INV are specified by the operator and stored in the register 440. An output signal/RE1 of a NOR circuit 433 is an enable signal to enable the reading out of the second video signal LSDA from the video memory 310 at such a timing that the second video image is displayed on the superimpose area SIA of FIG. 7(C). The structure and functions of the superimpose control circuit 420 are described more in detail in a commonly-owned co-pending U.S. patent application No. 08/185,155, now allowed, which is a continuation of Ser. No. 08/039,708 filed on Mar. 31, 1993, which is a continuation application of Ser. No. 07/873,322, which is a continuation application of Ser. No. 07/474,768, the disclosure of which are incorporated by reference herein.

F. Modification

The video processing circuit described above can be constructed in either of positive logic and negative logic. The AND circuit 451 and the NAND circuit 450 can be replaced by other equivalent circuits which have a switching function such as OR circuits, multiplexers, and analog switches.

Although the color comparator circuit 554 shown in FIG. 6 is a digital circuit, it can be constructed as an analog circuit. When the color comparator circuit 554 is an analog circuit, the upper threshold values DU and the lower threshold values DL are converted to analog values to be compared with the second video signal LSDA.

Since the first video signal LSPC is a digital video signal, the D-A converter 410 of FIG. 6 can be omitted when the monitor operated by digital video signals is applied, such as a liquid-crystal display device, while a digital selector is used as the video switch 510.

Video signals stored in the video memory 310 can be a variety of television signals including NTSC signals or compressed video data of moving and still pictures, which are previously stored in a CD-ROM (compact disc ROM). The first video signal LSPC, which is given from the video RAM 630 of the personal computer body 50 to the video processing circuit, can represent either of a moving picture and a still picture.

The present invention is applicable to a variety of video apparatus such as presentation tools, education tools, game machines, TV telephones, digital TV sets, photocopy machines, and communication equipment as well as the personal computers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video processing apparatus, usable with a computer system comprising: a processor for performing logical operation, a first video memory for storing first video data, a display controller for generating a first analog video signal from said first video data stored in said first video memory and a first synchronizing signal for said first analog video signal, and display means for displaying a video image; said video processing apparatus superimposing a moving video image represented by a second analog video signal upon at least part of a first video image represented by said first analog video signal, said video processing apparatus comprising:

an A-D converter for converting said second analog video signal representing a moving picture into second video data;

a second video memory for storing said second video data;

write control means for writing said second video data into said second video memory in synchronism with a second synchronizing signal for said second analog video signal;

a memory for storing color range data defining a predetermined range of chromaticity having an upper limit value and a lower limit value;

read control means for reading out said second video data from said second video memory in synchronism with said first synchronizing signal;

color comparator means for comparing said second video data read out by said read control means with said color range data to generate a color comparison signal indicating whether a value of said second video data is in said predefined range of chromaticity;

a D-A converter for converting said second video data read out by said read control means into a third analog video signal representing a moving picture in synchronism with said first synchronizing signal; and a video switch for selecting one of said first analog video signal and said third analog video signal in response to said color comparison signal, and outputting said selected video signal to said display means to display a composed image in which the moving picture represented by said third analog video signal is superimposed in the first video image represented by said first analog video signal.

2. A video processing apparatus in accordance with claim 1, wherein said color comparator means comprises means for setting said color comparison signal at a first level indicating selection of said first analog video signal when a chromaticity represented by said second video data is within said predetermined range of chromaticity, and setting said color comparison signal at a second level indicating selection of said third analog video signal when said chromaticity represented by said second video data is out of said predetermined range of chromaticity.

3. A video processing apparatus in accordance with claim 2, wherein said color range data include an upper threshold value and a lower threshold value of each color signal for three primary colors of R (red), G (green), and B (blue); and said color comparator means further comprises means for judging whether all of said color signals for the three primary colors constituting said second video data are within respective ranges between said upper threshold values and said lower threshold values.

4. A video processing apparatus in accordance with claim 1, further comprising:

control means for supplying a read enable signal to said second video memory, said enable signal allowing said second video memory to output said second video data at such a timing that said third analog video signal is displayed on a previously specified area in said first video image.

5. A video processing apparatus in accordance with claim 1, further comprising:

selection signal generator means, inserted between said color comparator means and said video switch, for generating a selection signal by performing a logical operation on said color comparison signal and a predetermined signal, and outputting said selection signal to said video switch to allow said video switch to select one of said first analog video signal and said third analog video signal.

6. A video processing apparatus in accordance with claim 5, further comprising:

multi-superimpose control means for generating an enable signal as said predetermined signal, said enable signal indicating whether or not to further superimpose said first video image upon at least part of said third analog video signal which is superimposed upon said first video image.

7. A video processing apparatus in accordance with claim 6, wherein said multi-superimpose control means comprises means for generating said enable signal when at least one of color of red, green, and blue, signals for three primary colors constituting said first analog video signal exceeds a predetermined level.

8. A video processing apparatus in accordance with claim 5, further comprising:

inversion means for generating an inversion specification signal as said predetermined signal, said inversion specification signal specifying whether or not to logically invert said color comparison signal;

wherein said selection signal generator means comprises means for generating said selection signal by performing a logical operation on said color comparison signal and said inversion specification signal.

9. A video processing apparatus in accordance with claim 1, further comprising:

decoder means for decoding a fourth video signal externally given as an analog composite signal, to thereby separate said fourth video signal into a synchronizing signal and an analog color signal;

conversion means for converting said analog color signal into a digital color signal; and write control means for writing said digital color signal as said second video data in said second video memory.

10. A video processing apparatus in accordance with claim 9, further comprising:

a television tuner for receiving a television signal as said fourth video signal.

11. A computer system comprising:

a processor for performing logical operation, a first video memory for storing first video data;

a display controller for generating a first analog video signal from said first video data stored in said first video memory and a first synchronizing signal for said first analog video signal;

display means for displaying a video image; and a video processing apparatus superimposing a moving video image represented by a second analog video signal upon at least part of a first video image represented by said first analog video signal comprising:

an A-D converter for converting said second analog video signal representing a moving picture into second video data;

a second video memory for storing said second video data;

write control means for writing said second video data into said second video memory in synchronism with a second synchronizing signal for said second analog video signal;

a memory for storing color range data defining a predetermined range of chromaticity having an upper limit value and a lower limit value;

read control means for reading out said second video data from said second video memory in synchronism with said first synchronizing signal;

color comparator means for comparing said second video data read out by said read control means with said color range data to generate a color comparison signal indicating whether a value of said second video data is in said predefined range of chromaticity;

a D-A converter for converting said second video data read out by said read control means into a third analog video signal representing a moving picture in synchronism with said first synchronizing signal; and a video switch for selecting one of said first analog video signal and said third analog video signal in response to said color comparison signal, and outputting said selected video signal to said display means to display a composed image in which the moving picture represented by said third analog video signal is superimposed in the first video image represented by said first analog video signal.

12. A video processing method, usable with a computer system comprising: a processor for performing logical operation, a first video memory for storing first video data, a display controller for generating a first video signal from said first video data stored in said first video memory and a first synchronizing signal for said first analog video signal, display means for displaying a video image, and a video processing apparatus superimposing a moving video image represented by a second analog video signal upon at least part of a first video image represented by said first analog video signal, said video processing method comprising the steps of:

(a) converting said second analog video signal representing a moving picture into second video data;

(b) storing said second video data in a second video memory;

(c) writing said second video data into said second video memory in synchronism with a second synchronizing signal for said second analog video signal;

(d) reading out said second video data from said second video memory in synchronism with said first synchronizing signal by read control means;

(e) comparing said second video data read out by said read control means with a color range data defining a predetermined range of chromaticity having an upper limit value and a lower limit value, to thereby generate a color comparison signal indicating whether a value of said second video data is in said predetermined range of chromaticity; and (f) converting said second video data read out by said read control means into a third analog video signal representing a moving picture in synchronism with said first synchronizing signal; and (g) selecting one of said first analog video signal and said third analog video signal in response to said color comparison signal, and outputting said selected video signal to said display means to display a composed image in which the moving picture represented by said third analog video signal is superimposed in the first video image represented by said first analog video signal.

13. A video processing method in accordance with claim 12, wherein said step (e) comprises the step of:

(e-1) setting said color comparison signal at a first level indicating selection of said first analog video signal when a chromaticity represented by said second video data is within said predetermined range of chromaticity, and setting said color comparison signal at a second level indicating selection of said third analog video signal when said chromaticity represented by said second video data is out of said predetermined range of chromaticity.

14. A video processing method in accordance with claim 13, wherein said color range data include an upper threshold value and a lower threshold value of each color signal for three primary colors of R (red), G (green), and B (blue); and said step (e) further comprises the step of:

(e-2) judging whether all of said color signals for the three primary colors constituting said second video data are within respective ranges between said upper threshold values and said lower threshold values.

15. A video processing method in accordance with claim 12, further comprising the step of:

reading out said second video data from said video memory at a timing when said third analog video signal is displayed on a previously specified area in said first video image.

16. A video processing method in accordance with claim 12, wherein said step (g) comprising the steps of:

(g-1) generating a selection signal by performing logical operation of said color comparison signal and a predetermined signal, and selecting one of said first analog video signal and said third analog video signal in response to said selection signal.

17. A video processing method in accordance with claim 16, wherein said step (g) further comprising the step of:

(g-2) generating an enable signal as said predetermined signal, said enable signal showing whether or not to further superimpose said first analog video image upon at least part of said third analog video image which is superimposed upon said first video image.

18. A video processing method in accordance with claim 17, wherein said step (g-2) includes the step of generating said enable signal when at least one of color signals of red, green, and blue, for three primary colors constituting said first analog video signal exceeds a predetermined level.

19. A video processing method in accordance with claim 16, wherein said step (g) further comprises the step of:

(g-3) generating an inversion specification signal as said predetermined signal, said inversion specification signal specifying whether or not to logically invert said color comparison signal; and said step (g-1) generates said selection signal by performing a logical operation on said color comparison signal and said inversion specification signal.

20. A video processing method in accordance with claim 12, further comprising the steps of:

(h) decoding a fourth video signal externally given as an analog composite signal, to thereby separate said fourth video signal into a synchronizing signal and an analog color signal;

(i) converting said analog color signal into a digital color signal; and (j) writing said digital color signal as said second video data in said second video memory.

21. A video processing method in accordance with claim 20, wherein said step (h) comprising the step of receiving a television signal as said fourth video signal.

* * * * *